US008089916B2

(12) United States Patent
Gulasekaran et al.

(10) Patent No.: US 8,089,916 B2
(45) Date of Patent: Jan. 3, 2012

(54) LEVERAGING COHERENT DISTRIBUTED SPACE-TIME CODES FOR NONCOHERENT COMMUNICATION IN RELAY NETWORKS VIA TRAINING

(75) Inventors: Susinder Rajan Gulasekaran, Chennai (IN); Balaji Sundar Rajan, Bangalore (IN)

(73) Assignee: Indian Institute of Science, Bangalore, Karnataka (IN)

( * ) Notice: Subject to any disclaimer, the term of this patent is extended or adjusted under 35 U.S.C. 154(b) by 429 days.

(21) Appl. No.: 12/419,430

(22) Filed: Apr. 7, 2009

(65) Prior Publication Data
US 2010/0254300 A1 Oct. 7, 2010

(51) Int. Cl.
*H04B 7/14* (2006.01)
(52) U.S. Cl. ........ 370/315; 370/208; 370/347; 370/321; 455/7
(58) Field of Classification Search ........................ None
See application file for complete search history.

(56) References Cited

U.S. PATENT DOCUMENTS

| | | | | |
|---|---|---|---|---|
| 7,746,815 | B2 * | 6/2010 | Can et al. | 370/315 |
| 2009/0196214 | A1 * | 8/2009 | Li et al. | 370/315 |
| 2010/0014453 | A1 * | 1/2010 | Erkip et al. | 370/315 |
| 2011/0165835 | A1 * | 7/2011 | Horiuchi et al. | 455/7 |

OTHER PUBLICATIONS

G. Susinder Rajan et al., "Leveraging Coherent Distributed Space-Time Codes for Noncoherent Communication in Relay Networks via Training," IEEE Transactions on Wireless Communications, vol. 8, No. 02, pp. 683-688, Feb. 2009.
Jing et al., "Distributed Space-Time Coding in Wireless Relay Networks," IEEE Transactions on Wireless Communications, vol. 5, No. 12, pp. 3524-3536, Dec. 2006.
P. Dayal et al., "Leveraging Coherent Space-Time Codes for Noncoherent Communication Via Training," IEEE Trans. Inf. Theory, vol. 50, No. 9, pp. 2058-2080, Sep. 2004.
Kiran T. et al., "Distributed Space-Time Codes with Reduced Decoding Complexity," Proc. IEEE International Symposium on Inform Theory, Seattle, pp. 542-546, Jul. 9-14, 2006.
Jing et al., "Using Orthogonal and Quasi-Orthogonal Designs in Wireless Relay Networks," IEEE Trans. Inf. Theory, vol. 53, No. 11, pp. 4106-4118, Nov. 2007.
P. Elia et al., "Asymptotically Optimal Cooperative Wireless Networks with Reduced Signaling Complexity," IEEE J. Select. Areas Commun., vol. 25, No. 2, pp. 258-267, Feb. 2007.
B. Maham et al., "Distributed GABBA Space-Time Codes in Amplify-and-Forward Cooperation," Proc. IEEE Information Theory Workshop, Bergen, Norway, pp. 1-5, Jul. 1-6, 2007.
G. Susinder Rajan et al., "OFDM based Distributed Space Time Coding for Asynchronous Relay Networks," arXiv:0804.2998, Apr. 2008.
G. Susinder Rajan et al., "Multi-group ML Decodable Collocated and Distributed Space Time Block Codes," arXiv:0712.2384, Dec. 2007.

(Continued)

*Primary Examiner* — Duc C Ho
(74) *Attorney, Agent, or Firm* — Ren-Sheng International

(57) ABSTRACT

In a training cycle, a source node transmits at least one pilot symbol to relay nodes in a training cycle. The relay nodes each amplifies and forwards the pilot symbol to a destination node in an assigned time slot in the training cycle. The destination node sequentially receives multiple versions of the pilot symbol from the relay nodes and estimates channel information based on the multiple versions of the pilot symbol. In data transmission cycles that follow the training cycle, the nodes apply coherent distributed space-time block code (DSTBC) with the estimated channel information to communicate data symbols. The power allocation between training and data cycles may be adjusted to improve the error performance. The nodes may also apply orthogonal frequency division multiplexing (OFDM) based DSTBC when timing errors are not known.

21 Claims, 9 Drawing Sheets

OTHER PUBLICATIONS

Laneman, J.N. and Wornell, G.W., "Distributed Space-Time Coded Protocols for Exploiting Cooperative Diversity in Wireless Networks," IEEE Trans. Inf. Theory, Oct. 2003, vol. 49, No. 10, pp. 2415-2425.

T., Kiran and Rajan, B. Sundar, "Partially-Coherent Distributed Space-Time Codes with Differential Encoder and Decoder," IEEE J. Select Areas Communication, Feb. 2007, vol. 25, No. 2, pp. 426-433.

Jing, Y. and Jafarkhani, H., "Distributed Differential Space-Time Coding for Wireless Relay Networks," to appear in IEEE Trans. Communication, Private Communication, pp. 1-8.

Oggier, F., Hassibi, B., "Cyclic Distributed Space-Time Codes for Wireless Networks with no Channel Information," submitted, Mar. 2007. Available online http://www.systems.caltech.edu/~frederique/submitDSTCnoncoh.pdf.

Rajan, G. Susinder and Rajan, B. Sundar, "Algebraic Distributed Differential Space-Time Codes with Low Decoding Complexity," to appear in IEEE Trans. Wireless Communication, available in arXiv: 0708.4407, pp. 1-10.

* cited by examiner

| Terminal | Slot 1 | Slot 2 | ... | Slot M+1 | Slot M+2 | ... | Slot R+1 |
|---|---|---|---|---|---|---|---|
| Source | $\sqrt{\pi_1 P_t}$ | | | | | | |
| Relay 1 | | $\sqrt{\dfrac{\pi_1\pi_2 P_t^2 R}{\pi_1 P_t+1}} f_1 + \sqrt{\dfrac{\pi_2 P_t R}{\pi_1 P_t+1}} n_1$ | | | | | |
| ... | | | | | | | |
| Relay M | | | | $\sqrt{\dfrac{\pi_1\pi_2 P_t^2 R}{\pi_1 P_t+1}} f_M + \sqrt{\dfrac{\pi_2 P_t R}{\pi_1 P_t+1}} n_M$ | | | |
| Relay M+1 | | | | | $\sqrt{\dfrac{\pi_1\pi_2 P_t^2 R}{\pi_1 P_t+1}} f_{M+1}^* + \sqrt{\dfrac{\pi_2 P_t R}{\pi_1 P_t+1}} n_{M+1}^*$ | | |
| ... | | | | | | | |
| Relay R | | | | | | | $\sqrt{\dfrac{\pi_1\pi_2 P_t^2 R}{\pi_1 P_t+1}} f_R^* + \sqrt{\dfrac{\pi_2 P_t R}{\pi_1 P_t+1}} n_R^*$ |

FIG. 3

| Terminal | Data transmission cycle 1 | | ... | Data transmission cycle $F$ |
|---|---|---|---|---|
| | Phase I Slots $R+2$ to $2R+1$ | Phase II Slots $2R+2$ to $3R+1$ | ... | Slots $R(2F-1)+2$ to $R(2F+1)+1$ |
| Source | $\sqrt{\pi_1 P_s} z$ | | | |
| Relay 1 | | $\sqrt{\frac{\pi_1 \pi_2 P_s^2}{\pi_1 P_s + 1}} f_1 B_1 z + \sqrt{\frac{\pi_2 P_s}{\pi_1 P_s + 1}} B_1 v_1$ | | ... |
| ... | | ... | | |
| Relay $M$ | | $\sqrt{\frac{\pi_1 \pi_2 P_s^2}{\pi_1 P_s + 1}} f_M B_M z + \sqrt{\frac{\pi_2 P_s}{\pi_1 P_s + 1}} B_M v_M$ | | |
| Relay $M+1$ | | $\sqrt{\frac{\pi_1 \pi_2 P_s^2}{\pi_1 P_s + 1}} f_{M+1} B_{M+1} z^* + \sqrt{\frac{\pi_2 P_s}{\pi_1 P_s + 1}} B_{M+1} v_{M+1}^*$ | | |
| ... | | ... | | |
| Relay $R$ | | $\sqrt{\frac{\pi_1 \pi_2 P_s^2}{\pi_1 P_s + 1}} f_R B_R z^* + \sqrt{\frac{\pi_2 P_s}{\pi_1 P_s + 1}} B_R v_R^*$ | | |

FIG. 4

LEVERAGING COHERENT DISTRIBUTED SPACE-TIME CODES FOR NONCOHERENT COMMUNICATION IN RELAY NETWORKS VIA TRAINING

BACKGROUND

Description of the Related Art

Unless otherwise indicated herein, the approaches described in this section are not prior art to the claims in this application and are not admitted to be prior art by inclusion in this section.

Space-time coding in wireless communications has shown to provide benefits in multiple input multiple output (MIMO) systems. Similar benefits are known to be available when space-time coding is applied to wireless relay networks using distributed space-time coding. In general, there are two types of distributed space-time coding techniques: DF-based and AF-based. In the DF-based technique, the relays decode and forward (DF) distributed space-time coding, wherein a subset (chosen based on some criteria) of the relays decode the symbols from the source and transmit a column of a distributed space-time block code (STBC). In the AF-based technique, the relays amplify and forward (AF) distributed space-time coding, wherein all the relays perform linear processing on the received symbols according to a distributed space-time block code (DSTBC) and transmit the resulting symbols to the destination.

AF-based distributed space-time coding simplifies the operations at the relays. It also does not require every relay to inform the destination once every quasi-static duration whether it will participate in the distributed space-time coding process as in the case in the DF-based technique. However, the AF-based distributed space-time coding assumes a coherent channel where the destination has a perfect accurate knowledge of all the channel fading gains from the source to the relays and from the relays to the destination.

To overcome the need for channel knowledge, distributed differential space-time coding has been used. This is essentially an extension of differential unitary space-time coding for point to point MIMO systems to the relay network case. However, the distributed differential space-time block code (DDSTBC) design is more difficult to implement than coherent DSTBC design because of extra stringent conditions that need to be met by the codes. Moreover, the distributed differential space-time block codes for multiple relays can have exponential encoding complexity. On the other hand, maximum likelihood (ML) decoders with reduced decoding complexity are available for coherent DSTBC.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 3 illustrates a training cycle for an AF-based relay network;

FIG. 4 illustrates data transmission cycles for the AF-based relay network;

DETAILED DESCRIPTION

Figure 1:
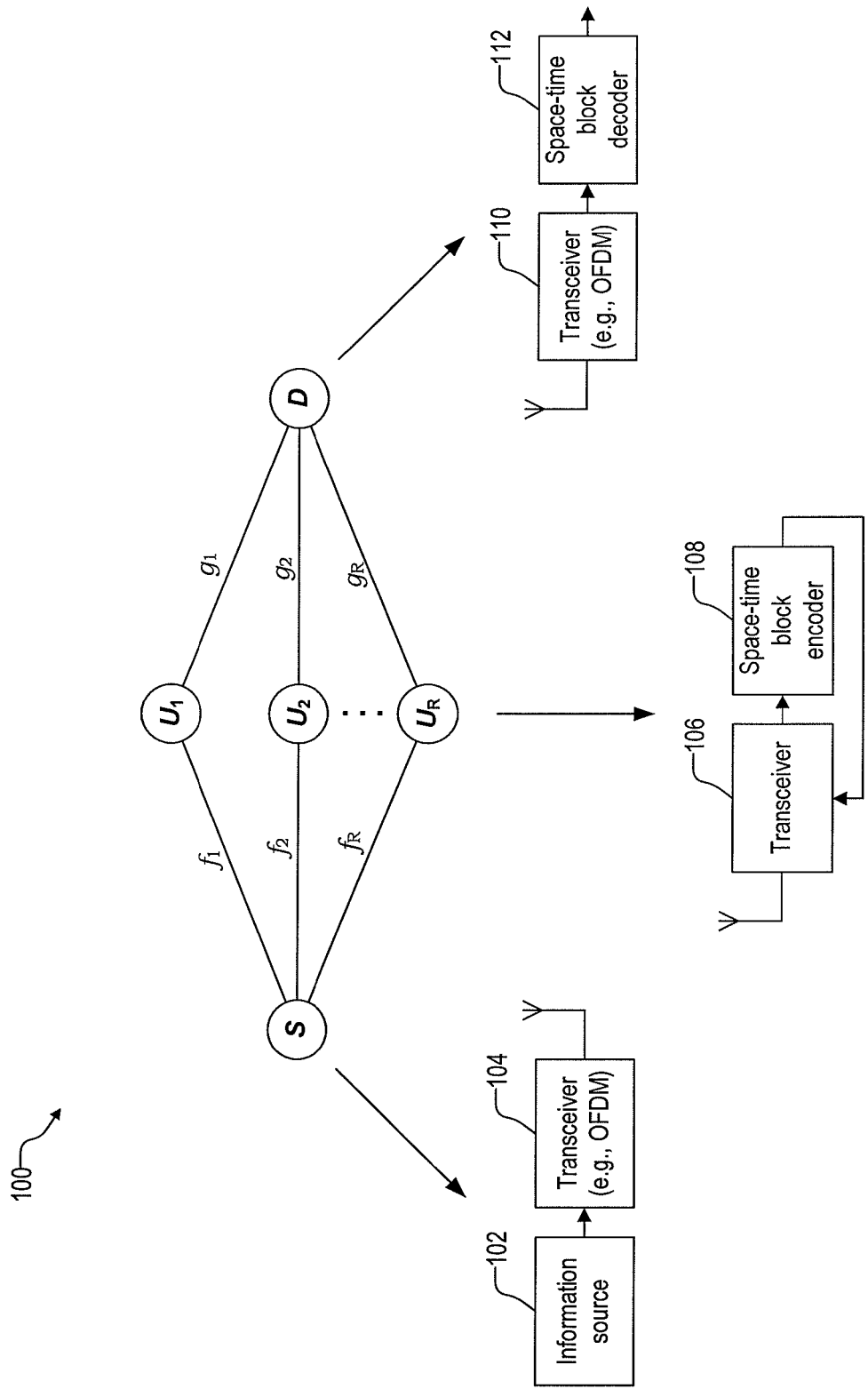
FIG. 1 illustrates a synchronous AF-based relay network.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, computer programs and systems related to a training and channel estimation scheme used in conjunction with coherent distributed space-time coding in an AF-based relay network.

For point to point MIMO systems, training codes can achieve the same diversity order as that of a coherent STBC if a minimum mean squared error (MMSE) estimate of the channel formed using the training part of the code is employed as if it were error free for coherent detection of an underlying STBC. Each codeword of a training code consists of a part known to the receiver (pilot) and a part that contains codeword(s) of a STBC designed for a coherent channel in which the receiver has perfect knowledge of the channel. It is also know that training codes can have an error rate comparable to the best performing differential unitary STBCs.

Embodiments of the present disclosure employs a similar training and channel estimation scheme in conjunction with coherent distributed space-time coding in an AF-based relay network. In this scheme, the relays do not perform any channel estimation using the training symbols transmitted by the source. Rather, the relays simply amplify and forward the received training symbols. In addition, appropriate power allocation among the training and data symbols in the wireless training-based relay network may further improve the error performance. Furthermore, this scheme may be extended to asynchronous relay networks with no knowledge of the timing errors by using Orthogonal Frequency Division Multiplexing (OFDM) based distributed space-time coding.

FIG. 1 illustrates a wireless AF-based relay network 100 in one embodiment of the disclosure. Network 100 includes a source node S, a destination node D, and R relay nodes $U_1$, $U_2$, . . . , $U_R$ that aid the source node in communicating information to the destination node. In one embodiment, all the nodes are assumed to be equipped with a half duplex constrained, single antenna transceiver so a node cannot transmit and receive simultaneously in the same frequency. All the nodes can be implemented using hardware, software, or a combination thereof.

In one embodiment, source node S includes an information source 102 and a transceiver 104. Information source 102 provides a bitstream of data and transceiver 104 uses a mapping rule, such as quadrature amplitude modulation (QAM), to generate complex symbols (e.g., complex numbers) from segments of the bitstream. Transceiver 104 transforms the complex symbols from electrical signals (baseband signals) to RF signals (passband signals) using an in-phase and quadrature-phase (IQ) modulator, amplifies and filters the RF signals, and transmits the RF signals to the relay nodes via its antenna.

In one embodiment, each of relay nodes relay nodes $U_1$, $U_2$, ..., $U_R$ includes a transceiver 106 and a space-time block encoder 108. Transceiver 106 amplifies the received RF signals from the source, synchronizes to the RF signals in frequency and time, and uses a matched filter to transform the RF signals to electrical signals representing complex symbols. According to a relay matrix, space-time block encoder 108 reorders the complex symbols, conjugates the complex symbols or leaves them as they are, and changes the sign of the complex symbols or leaves them as they are. Transceiver 106 transforms the complex symbols from electrical signals to RF signals using an IQ modulator, amplifies and filters the RF signals, and transmits the RF signals to the destination node via its antenna.

In one embodiment, destination node D includes a transceiver 110 and a space-time block decoder 112. Transceiver 110 amplifies the received RF signals from the relays, synchronizes to the RF signals in frequency and time, and uses a matched filter to transform the RF signals to electrical signals representing complex symbols. Space-time block decoder 112 decodes the complex symbols into data.

In one embodiment, the wireless channels between the nodes are assumed to be quasi-static and flat fading. The channel fading gains from the source node to the i-th relay node, $f_i$, and the channel fading gains from the j-th relay node to the destination node, $g_j$, are all assumed to be independent and identically distributed complex Gaussian random variables with zero mean and unit variance. Symbol synchronization and carrier frequency synchronization are assumed among all the nodes. Moreover, the destination node is assumed to have perfect knowledge of all the channel fading gains $f_i, g_i, i=1, \ldots, R$.

For coherent distributed space-time coding in network 100, every transmission cycle from the source node to the destination node comprises two phases. In the first phase, also known as the "broadcast phase," the source node transmits a vector $z=[z_1 \ z_2 \ldots z_{T_1}]^T$ composed of $T_1$ complex symbols $z_i$, $i=1, \ldots, T_1$ to all the R relay nodes using a fraction $\pi_1$ of the total power $P_d$ for data transmission. The vector z satisfies $E[z^H z]=T_1$ and $P_d$ denotes the total average power spent by the source node and the relay nodes for communicating data to the destination node. The received vector at the i-th relay node is then given by $r_i=\sqrt{\pi_1 P_d} f_i z + v_i$ where, $v_i \sim CN(0, I_{T_1})$ represents the additive noise at the i-th relay $U_i$. Note that $CN(0,\Omega)$ denotes a complex Gaussian vector with zero mean and covariance matrix $\Omega$.

In the second phase, also known as the "cooperation phase," all the relay nodes are scheduled to transmit together. The i-th relay node transmits $$t_i = \sqrt{\frac{\pi_2 P_d}{\pi_1 P_d + 1}} B_i r_i$$

or $$t_i = \sqrt{\frac{\pi_2 P_d}{\pi_1 P_d + 1}} B_i r_i^*$$

to the destination node, where $B_i$ is a complex matrix of size $T_2 \times T_1$ called the "relay matrix" and $T_2$ denotes the number of channel uses employed for the relay's transmission during the cooperation phase. Without loss of generality, it is assumed that the first M relay nodes linearly process $r_i$, and the remaining R-M relay nodes linearly process $r_i^*$ (the conjugate of $r_i$). Under the assumption that the quasi-static duration of the channel is much greater than 2R channel uses, the received vector at the destination node can be expressed as $$y = \sum_{j=1}^{R} g_j t_j + w = \sqrt{\frac{\pi_1 \pi_2 P_d^2}{\pi_1 P_d + 1}} Xh + n \quad (1)$$

where, $$X = [B_1 z \ \ldots \ B_M z \ B_{M+1} z^* \ \ldots \ B_R z^*],$$

$$h = [f_1 g_1 \ f_2 g_2 \ \ldots \ f_M g_M \ f_{M+1}^* g_{M+1} \ \ldots \ f_R^* g_R]^T,$$

$$n = \sqrt{\frac{\pi_2 P_d}{\pi_1 P_d + 1}} \left( \sum_{j=1}^{M} g_j B_j v_j + \sum_{j=M+1}^{R} g_j B_j v_j^* \right) + w,$$

and $w \sim CN(0, I_{T_2})$ represents the additive noise at the destination. The power allocation factors $\pi_1$ and $\pi_2$ are chosen to satisfy $\pi_1 P_d + \pi_2 P_d R = 2 P_d$. The covariance matrix of n is given by $$\Gamma = E[nn^H] = I_{T_2} + \frac{\pi_2 P_d}{\pi_1 P_d + 1} \left( \sum_{i=1}^{R} |g_i|^2 B_i B_i^H \right).$$

Let the DSTBC $\Lambda$ denote the set of all possible codeword matrices X. Then the Maximum Likelihood (ML) decoder is given by $$\hat{X} = \mathrm{argmin}_{X \in \Lambda} \left\| \Gamma^{-\frac{1}{2}} \left( y - \sqrt{\frac{\pi_1 \pi_2 P_d^2}{\pi_1 P_d + 1}} Xh \right) \right\|_F^2. \quad (2)$$

Note from Eq. (2) that the ML decoder in general requires the knowledge of all the channel fading gains $f_i, g_i, i=1, \ldots, R$ because $\Gamma$ requires knowledge of the $g_i$'s and the equivalent channel matrix h requires knowledge of $f_i g_i, i=1, \ldots, M$ and $f_i^* g_i, i=M+1, \ldots, R$ Consider the following decoder:

$$\hat{X} = \mathrm{argmin}_{X \in \Lambda} \left\| y - \sqrt{\frac{\pi_1 \pi_2 P_d^2}{\pi_1 P_d + 1}} Xh \right\|_F^2. \quad (3)$$

The decoder represented in Eq. 3 is suboptimal in general and coincides with the ML decoder for the case when $\Gamma$ is a scaled identity matrix. For the case when $B_i B_i^H$ is a diagonal matrix for all $i=1, 2, \ldots, R$ ($\Gamma$ is a diagonal matrix for this case), the performance of the suboptimal decoder in Eq. 3 differs from that of the ML decoder in Eq. 2 only by coding gain while the diversity gain is retained.

The decoder in Eq. 3 requires only the knowledge of the equivalent channel matrix h and not necessarily the knowledge of all the individual channel fading gains $f_i$, $g_i$, $i=1, \ldots, R$. The training strategy to be described below essentially exploits this crucial observation.

Figure 2:
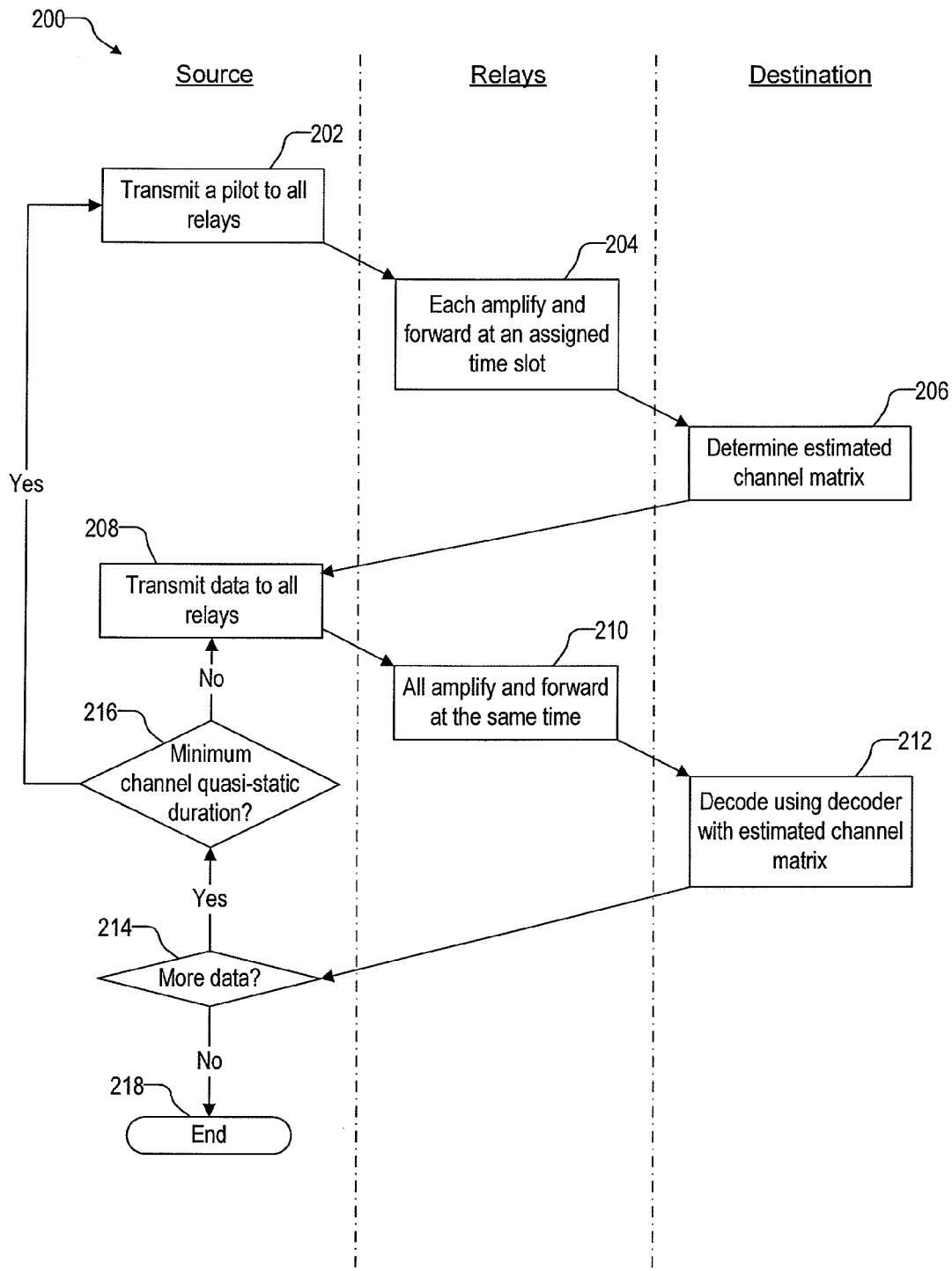
FIG. 2 is a flowchart of a method for source, relay, and destination nodes in the network of FIG. 1 to employ training.

FIG. 2 is an illustrative flowchart of an example method 200 for the source node, the relay nodes, and the destination node to use training and channel estimation in conjunction with coherent distributed space-time coding in network 100 described above. Method 200 includes a training cycle followed by one or more data transmission cycles. The training cycle involves the transmission and the decoding of known training data to estimate the equivalent channel matrix h. The data transmission cycles employ coherent DSTBC with the decoder in Eq. 3 using the estimated equivalent channel matrix $\hat{h}$. Thus, coherent DSTBCs can be employed in non-coherent relay networks via the proposed training scheme.

Note that in the coherent distributed space-time coding described above, one data transmission cycle comprises 2R channel uses. Embodiments of the disclosure may employ a training strategy where a training cycle comprising R+1 channel uses for channel estimation before the start of data transmission cycle. The quasi-static duration of the channel is assumed to be greater than (R+1)+F(2R) channel uses where F denotes the total number of data transmission cycles that can be accommodated within the channel quasi-static duration. Thus the minimum channel quasi-static duration required for the new training strategy is 3R+1 channel uses. Let $P_t$ be the total average power spent by the source and the relays during the training cycle. Thus the total average power P used by the source and the relays is $P = \dfrac{P_t(R+1) + P_d(F2R)}{R(2F+1)+1}.$ Referring to FIG. 2, operation 202 is the first phase of the training cycle. In operation 202, the source node transmits a pilot to all the relay nodes using a fraction $\pi_1$ of the total power $P_t$ dedicated to training. In one embodiment, the pilot is the complex number 1. FIG. 3 pictorially illustrates the source node transmitting the pilot to the relay nodes in time slot 1. The received symbol at the i-th relay node denoted by $\hat{r}_i$ is given by $\hat{r}_i = \sqrt{\pi_1 P_t} f_i + \hat{v}_i$, where $\hat{v}_i \sim CN(0,1)$ is the additive noise at the i-th relay node. Referring back to FIG. 2, operation 202 is followed by operation 204.

Operation 204 is the second phase of the training cycle. The second phase of the training cycle includes R channel uses, out of which one channel use is assigned to every relay node. Without loss of generality, it is assumed that the i-th time slot is assigned to the i-th relay node. Furthermore, the value of M to be used during the data transmission cycle is assumed to be already decided. Each relay node transmits during its assigned time slot. During its assigned time slot, the i-th relay node transmits transmits $\hat{t}_i =$ $$\begin{cases} \sqrt{\dfrac{\pi_2 P_t R}{\pi_1 P_t + 1}} \hat{r}_i = \sqrt{\dfrac{\pi_1 \pi_2 P_t^2 R}{\pi_1 P_t + 1}} f_i + \sqrt{\dfrac{\pi_2 P_t R}{\pi_1 P_t + 1}} \hat{v}_i, & \text{if } i \le M \\ \sqrt{\dfrac{\pi_2 P_t R}{\pi_1 P_t + 1}} \hat{r}_i^* = \sqrt{\dfrac{\pi_1 \pi_2 P_t^2 R}{\pi_1 P_t + 1}} f_i^* + \sqrt{\dfrac{\pi_2 P_t R}{\pi_1 P_t + 1}} \hat{v}_i^*, & \text{if } i > M. \end{cases}$$

FIG. 3 pictorially illustrates the relay nodes transmitting their data in their respective time slots 2 to R+1. When the pilot is the complex number 1, each relay node transmits a faded noise corrupted version of a row of an identity matrix when viewed in time.

Based on the number R of relay nodes, the destination node may select the DSTBC for that number of relay nodes. The selected DSTBC may have a corresponding value M. The destination node may centrally assign time slots for each relay to transmit and also a relay matrix for every relay node. This information may be communicated by the destination node to each relay before the start of actual data transfer. Alternatively, the above steps can be performed by the source node instead of the destination node. Referring back to FIG. 2, operation 204 is followed by operation 206.

Operation 206 is the end of the training cycle. In the end of the training cycle, the destination node determines the estimated equivalent channel matrix $\hat{h}$ for the current quasi-static duration from the received vector $\hat{y}$. The received vector $\hat{y}$ at the destination node is given as follows:

$$\hat{y} = \sqrt{\dfrac{\pi_1 \pi_2 P_t^2 R}{\pi_1 P_t + 1}} I_R h + \hat{n} \qquad (4)$$

where $$\hat{n} = \sqrt{\dfrac{\pi_2 P_t R}{\pi_1 P_t + 1}} [g_1 \hat{v}_1 \ldots g_M \hat{v}_M \; g_{M+1} \hat{v}_{M+1}^* \ldots g_R \hat{v}_R^*]^T + \hat{w},$$

$\hat{h}$ is same as that given in Eq. 1 and $\hat{w} \sim CN(0, I_R)$ is the additive noise at the destination.

In one embodiment where the entries of the equivalent channel matrix h are treated as independent, identically distributed (i.i.d.) complex Gaussian random variables and $\hat{n}$ is treated as a complex Gaussian vector with zero mean and covariance $$\left(\dfrac{\pi_2 P_t R}{\pi_1 P_t + 1} + 1\right) I_R,$$

the estimated equivalent channel matrix $\hat{h}$ is determined as follows:

$$\hat{h} = \sqrt{\dfrac{\pi_1 \pi_2 P_t^2 R}{\pi_1 P_t + 1}} \left(\dfrac{\pi_2 P_t R + \pi_1 \pi_2 P_t^2 R}{\pi_1 P_t + 1} + 1\right)^{-1} \hat{y}. \qquad (5)$$

Operation 206 is followed by operation 208.

Operation 208 is the first phase of a data transmission cycle in coherent distributed space-time coding. As described above, the source node transmits a vector $z = [z_1 \; z_2 \ldots z_{T_1}]^T$ that represents data. FIG. 4 pictorially illustrates the source node transmitting data in the first phase in time slots R+2 to 2R+1. Referring to FIG. 2, operation 208 is followed by operation 210.

Operation 210 is the second phase of the current data transmission cycle in coherent distributed space-time coding. As described above, all the relay nodes are scheduled to transmit together. The i-th relay node transmits $$t_i = \sqrt{\frac{\pi_2 P_d}{\pi_1 P_d + 1}} B_i r_i \text{ or } t_i = \sqrt{\frac{\pi_2 P_d}{\pi_1 P_d + 1}} B_i r_i^*$$

to the destination where $B_i$ is the relay matrix. FIG. 4 pictorially illustrates the relay nodes transmitting data in the second phase in time slots 2R+2 to 3R+1. Referring to FIG. 2, operation 210 is followed by operation 212.

Operation 212 is the end of the current data transmission cycle. As described above, the destination node decodes the received vector y using the decoder of Eq. 3 with the estimated equivalent channel matrix ĥ for the current quasi-static duration. Operation 212 is followed by operation 214.

In operation 214, the source node determines if there are additional data to be transmitted. If so, operation 214 is followed by operation 216. If not, operation 214 is followed by operation 218, which ends method 200.

In operation 216, the source node determines if the time duration from the transmission of the pilot exceeds the minimum channel quasi-static duration. If so, operation 216 loops back to operation 202 to determine a new estimated equivalent channel matrix ĥ. Otherwise operation 218 loops back to operation 208 for the next data transmission cycle.

The training strategy described above assumes that the transmissions from all the relays are symbol synchronous with reference to the destination. The training strategy to be described below relaxes this assumption and extends the proposed training strategy to asynchronous relay networks with no knowledge of the timing errors of the relay transmissions. However, the maximum of the relative timing errors from the source to the destination is assumed to be known.

Figure 5:
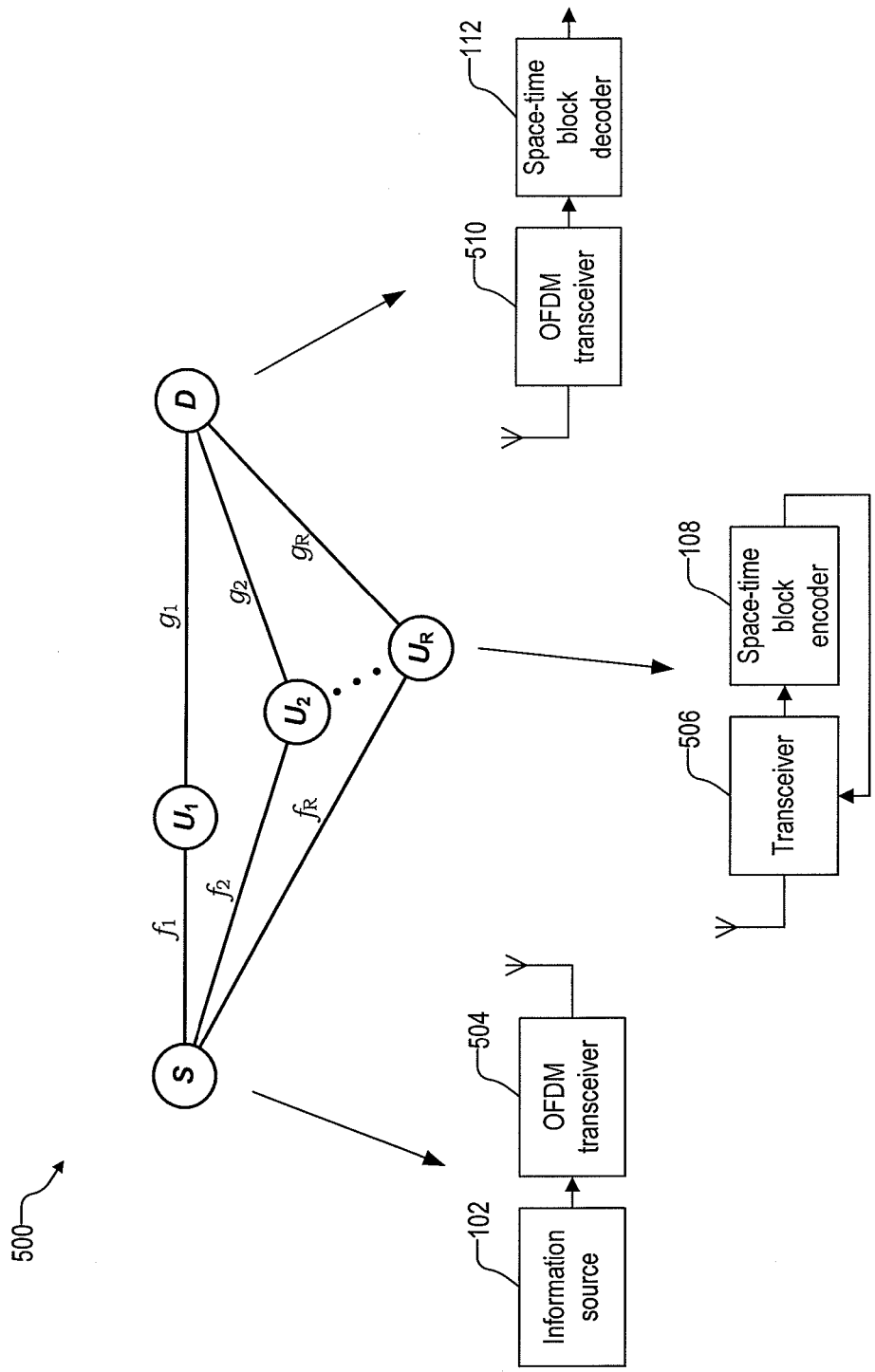
FIG. 5 illustrates an asynchronous AF-based relay network.

FIG. 5 illustrates an asynchronous AF-based relay network 500 in one embodiment of the disclosure. Network 500 is similar to network 100 except the relative timing errors of the relay transmissions are not known. Let $\tau_i$ denote the overall relative timing error of the signals arrived at the destination node from the i-th relay node. Without loss of generality, assume that $\tau_1=0, \tau_{i+1} \geq \tau_i$, i=1, . . . , R−1. In one embodiment, perfect carrier synchronization is assumed among all the nodes.

In one embodiment of source node S, information source 102 provides a bitstream of data to be transmitted and transceiver 504 uses a mapping rule, such as QAM, to generate complex symbols (e.g., complex numbers) from segments of the bitstream. Transceiver 504 then employs OFDM encoding using N subcarriers to transmit the complex symbols. Generally, transceiver 504 takes N complex symbols at a time, applies inverse discrete Fourier transform (IDFT) or discrete Fourier transform (DFT) to the complex symbols, and adds a cyclic prefix (CP) of length $l_{cp}$ complex numbers to form an OFDM symbol. Transceiver 504 then translates the OFDM symbol to a RF signal using an IQ modulator, amplifies and filters the RF signal, and transmitting the RF signal to the relay nodes via its antenna.

In one embodiment of relay nodes $U_1, U_2, \ldots, U_R$, transceiver 506 amplifies the received RF signals from the source node, synchronizes to the RF signals in frequency and time, and uses a matched filter to convert the RF signals to OFDM symbols. According to its relay matrix, space-time block encoder 108 reorders the OFDM symbols, conjugates the OFDM symbols or leaves them as they are, and changes the sign of the OFDM symbols or leaves them as they are. Transceiver 506 translates the OFDM symbols to RF signals using its IQ modulator, amplifies and filters the RF signals, and transmits the RF signals to the destination node via its antenna.

In one embodiment of destination node D, transceiver 510 amplifies the RF signals from the relay nodes, synchronizes to the RF signals in frequency and time, and uses a matched filter to convert the RF signals to OFDM symbols. Transceiver 510 then employs OFDM decoding by removing the CP for the first M OFDM symbols and, for the remaining ODFM symbols, removing the CP to get a N-length vector and then shifting the last $l_{cp}$ samples of the N-length vector as the first $l_{cp}$ samples. Transceiver 510 then applies DFT or IDFT to the R vectors to obtain complex symbols. Space-time block decoder 112 decodes the complex symbols into data.

Figure 6:
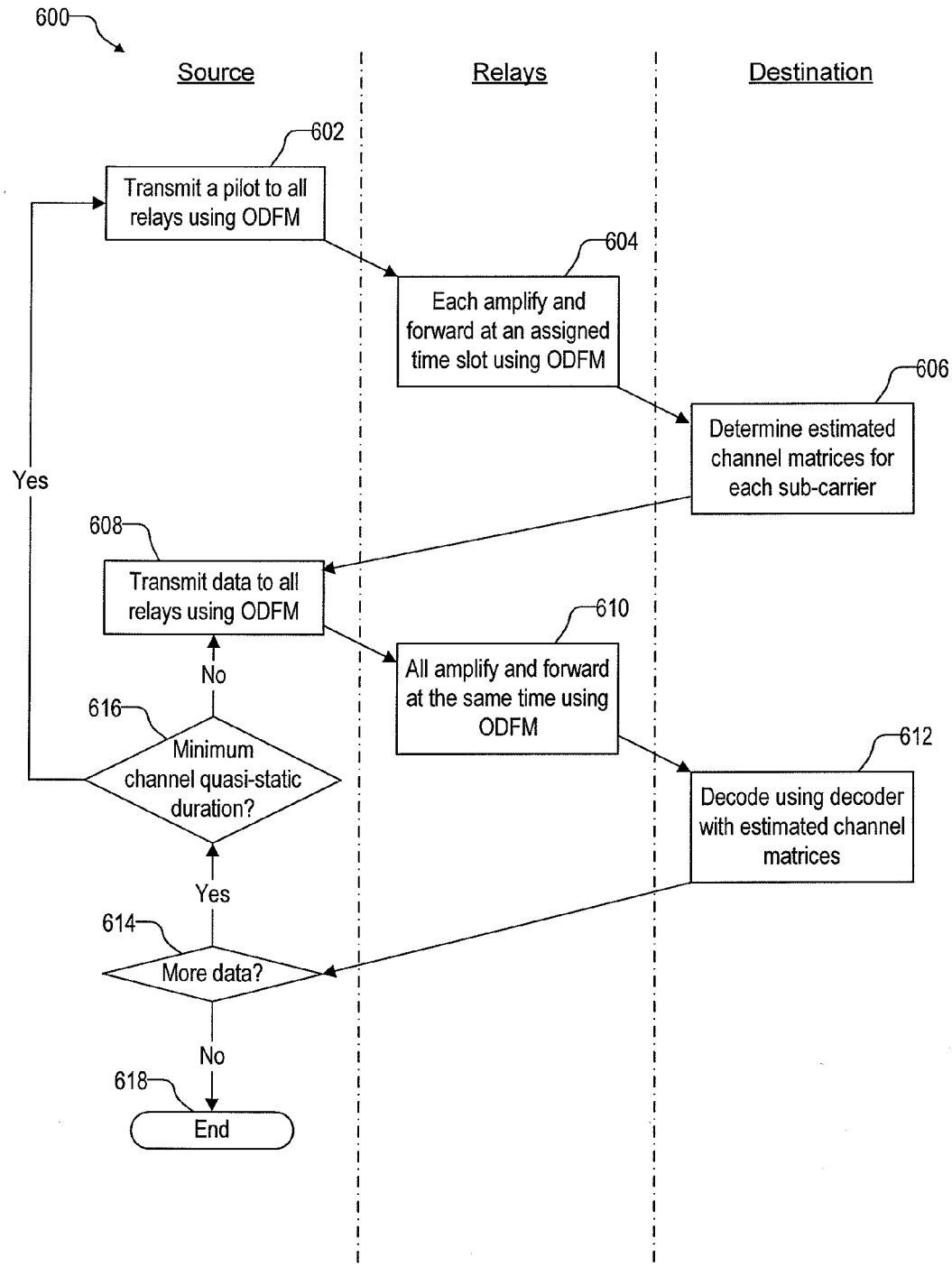
FIG. 6 is a flowchart of a method for source, relay, and destination nodes in the network of FIG. 5 to employ training.

FIG. 6 is a flowchart of a method 600 for the source node, the relay nodes, and the destination node to use training and channel estimation in conjunction with coherent distributed space-time coding in network 500 in one embodiment of the disclosure. Method 600 relies on the OFDM based distributed space-time coding, which is essentially distributed space-time coding over OFDM symbols and the CP of OFDM is used to mitigate the effects of symbol asynchronism. The number of sub-carriers N and the length $l_{cp}$ of the CP are chosen such that $l_{cp} \geq \max_{i=1, 2, \ldots, R}\{\tau_i\}$. The channel quasi-static duration is assumed to be $((R+1)+F(2R))(N+l_{cp})$ channel uses.

As with the synchronous case, there will be a training cycle before the start of data transmission from the source node. Operation 602 is the first phase of the training cycle. In operation 602, the source node takes the N point IDFT (or DFT) of the N length vector pilot p and adds a cyclic prefix (CP) of length $l_{cp}$ to form an OFDM symbol p̄. In one embodiment, vector p=[1 1 . . . 1]$^T$. The source transmits the OFDM symbol p̄ to the relay nodes using a fraction $\pi_1$ of the total power $P_t$. Operation 602 is followed by operation 604.

Operation 604 is the second phase of the training cycle. In operation 602, the i-th relay node receives $\hat{r}_i = \sqrt{\pi_1 P_t} f_i \bar{p} + \tilde{v}_i$ where $\tilde{v}_i \sim CN(0, I_{N+l_{cp}})$ where is the additive noise at the i-th relay node. Each relay node is allotted a unique OFDM time slot during in which only that relay node transmits. Assume that the i-th relay node is allotted the i-th OFDM time slot. Thus, the second phase comprises R OFDM time slots. Similar to the synchronous case, assume that the first M relay nodes linearly process the received vector and the remaining R-M relay nodes linearly process the conjugate of the received vector. During its scheduled time slot, the i-th relay node transmits $$\hat{t}_i = \begin{cases} \sqrt{\frac{\pi_2 R P_t}{\pi_1 P_t + 1}} \hat{r}_i, & \text{if } i \leq M \\ \sqrt{\frac{\pi_2 R P_t}{\pi_1 P_t + 1}} \zeta(\hat{r}_i^*), & \text{if } i > M \end{cases}$$

where $\zeta(.)$ denotes the time reversal operation which is defined below. For an $(N+l_{cp}) \times 1$ vector r, the function $\zeta(r)$ acts on each entry of r as given by:

$$\zeta(r(n)) = \begin{cases} r(1), & \text{if } n = 1 \\ r(N + l_{cp} - n + 2), & \text{if } 1 < n \leq N + l_{cp} \end{cases}$$

where r(n) denotes the n-th entry of r. Operation 604 is followed by operation 606.

Operation 606 is the end of the training cycle. In operation 606, the destination node receives R OFDM symbols. The destination first removes the CP for the first M OFDM symbols. For the remaining OFDM symbols, the destination removes the CP to get a N-length vector and then shifts the last $1_{cp}$ samples of the N-length vector as the first $1_{cp}$ samples.

The destination node applies DFT (or IDFT) on the resulting R vectors to obtain $\hat{x}_j = [\hat{y}_{0,j} \hat{y}_{1,j} \ldots \hat{y}_{N-1,j}]^T$, j=1, 2, ..., R. Let $\hat{w}_j = [\hat{w}_{0,j} \hat{w}_{1,j} \ldots \hat{w}_{N-1,j}]^T$ represent the additive noise at the destination node in the j-th OFDM time slot and let $\hat{v}_j = [\hat{v}_{0,j} \hat{v}_{1,j} \ldots \hat{v}_{N-1,j}]^T$ denote the DFT of $\tilde{v}_j$ after CP removal. Note that a delay $\tau$ in the time domain translates to a corresponding phase change of e $i2\pi k\tau/N$ in the k-th subcarrier. Now using the identities $(DFT(x))^* = IDFT(x^*)$, $(IDFT(x))^* = DFT(x^*)$, $DFT(\zeta(DFT(x))) = x$, $p^* = p$, then in the j-th OFDM time slot $$\hat{x}_j = \begin{cases} f_j g_j \sqrt{\frac{\pi_1 \pi_2 R P_t^2}{\pi_1 P_t + 1}} \, p \circ d^{\tau j} + \\ \sqrt{\frac{\pi_2 R P_t}{\pi_1 P_t + 1}} \, g_j \hat{v}_j \circ d^{\tau j} + \hat{w}_j & \text{if } j \leq M \\ f_j^* g_j \sqrt{\frac{\pi_1 \pi_2 R P_t^2}{\pi_1 P_t + 1}} \, p \circ d^{\tau j} + \\ \sqrt{\frac{\pi_2 R P_t}{\pi_1 P_t + 1}} \, g_j \hat{v}_j^* \circ d^{\tau j} + \hat{w}_j & \text{if } j > M \end{cases}$$

where $$d^{\tau j} = \begin{bmatrix} 1 & e^{-\frac{i 2 \pi \tau j}{N}} & \ldots & e^{-\frac{i 2 \pi \tau j (N-1)}{N}} \end{bmatrix}^T$$

and ○ denotes Hadamard product (product of two matrices of same dimension). Thus, in each sub-carrier k, $0 \leq k \leq N-1$, $$\hat{y}_k = [\hat{y}_{k,1} \, \hat{y}_{k,2} \, \ldots \, \hat{y}_{k,R}]^T = \sqrt{\frac{\pi_1 \pi_2 R P_t^2}{\pi_1 P_t + 1}} \, I_R h_k + \hat{n}_k \quad (6)$$

where $$h_k = \begin{bmatrix} f_1 g_1 u_k^{\tau_2} f_2 g_2 \ldots u_k^{\tau_M} f_M g_M \\ u_k^{\tau_{M+1}} f_{M+1}^* g_{M+1} \ldots u_k^{\tau_R} f_R^* g_R \end{bmatrix}^T, \quad (7)$$

$$u_k^{\tau_i} = e^{\frac{i 2 \pi k \tau_i}{N}}$$

and $$\hat{n}_k = \sqrt{\frac{\pi_2 P_t R}{\pi_1 P_t + 1}} \begin{bmatrix} u_k^{\tau_1} g_1 \hat{v}_{k,1} \ldots u_k^{\tau_M} g_M \hat{v}_{k,M} \\ u_k^{\tau_{M+1}} g_{M+1} \hat{v}_{k,M}^* \ldots u_k^{\tau_R} g_R \hat{v}_{k,R}^* \end{bmatrix} + \begin{bmatrix} \hat{w}_{k,1} \\ \hat{w}_{k,2} \ldots \hat{w}_{k,R} \end{bmatrix}^T.$$

Analogous to Eq. 3 in the synchronous case, the destination node estimates the equivalent channel matrix $h_k$ in Eq. 6 as:

$$\hat{h}_k = \sqrt{\frac{\pi_1 \pi_2 R P_t^2 R}{\pi_1 P_t + 1}} \left( \frac{\pi_2 P_t R + \pi_1 \pi_2 P_t^2 R}{\pi_1 P_t + 1} + 1 \right)^{-1} \hat{y}_k. \quad (8)$$

Operation 606 is followed by operation 608.

After the training cycle, the data transmission cycle starts with the transmission of R OFDM symbols containing data from the source node, which is then time reversed and/or conjugated by the relays before forwarding to the destination. In one embodiment, a DSTBC (similar to synchronous case) is seen by the destination node in every sub-carrier and the equivalent channel seen by the destination node in the k-th sub-carrier is precisely the equivalent channel matrix $h_k$, whose estimated value $\hat{h}_k$ is available at the end of the training cycle. As for the synchronous case (see Eq. 3), the covariance matrix of the equivalent noise is ignored while performing data detection.

Operation 608 is the first phase of a data transmission cycle. As described above, the source node employs OFDM encoding to transmit R OFDM symbols representing data. Operation 608 is followed by operation 610.

Operation 610 is the second phase of the current data transmission cycle. As described above, the relay nodes change the ordering of these OFDM symbols, conjugate the OFDM symbols or leave them as they are, change the signs of the OFDM symbols or leave them as they are according to the relay matrix before forwarding to the destination nodes. Operation 610 is followed by operation 612.

Operation 612 is the end of the current data transmission cycle. As described above, the destination node decodes the received vectors using the decoder of Eq. 3 with the estimated equivalent channel matrix $\hat{h}_k$ for each sub-carrier in the current quasi-static duration. Operation 612 is followed by operation 614.

In operation 614, the source node determines if there are additional data to be transmitted. If so, operation 614 is followed by operation 616. If not, operation 614 is followed by operation 618, which ends method 600.

In operation 616, the source node determines if the time duration from the transmission of the pilot has exceeded the minimum channel quasi-static duration. If so, operation 616 loops back to operation 602 to determine a new estimated equivalent channel matrix $\hat{h}_k$ for each sub-carrier. Otherwise operation 618 loops back to operation 608 for the next data transmission cycle.

Below simulations is used to compare the error performance of the proposed strategy against a currently reported DDSTBC for 4 relays that outperforms other codes in both complexity as well as performance.

The 4 relay network and the coherent DSTBC employed in the proposed strategy for simulations is $$X = \begin{bmatrix} x_1 & x_2 & -x_3^* & -x_4^* \\ x_2 & x_1 & -x_4^* & -x_3^* \\ x_3 & x_4 & x_1^* & x_2^* \\ x_4 & x_3 & x_2^* & x_1^* \end{bmatrix}$$

where the 2-tuples $\{Re(x_1), Re(x_2)\}, \{Re(x_3), Re(x_4)\}, \{Im(x_1), Im(x_2)\}$ and $\{Im(x_3), Im(x_4)\}$ take values from QAM signal set rotated by 166.7078° (QAM constellation size is chosen depending on the transmission rate). The relay matrices corresponding to this coherent DSTBC are unitary and M=2. We set $$\pi_1 = 1, \pi_2 = \frac{1}{R}, T_1 = T_2 = 4,$$

and F=50 for all the simulations. We chose $P_t=(1+\alpha)P_d$, where $\alpha$ denotes the power boost factor to allow for power boosting to the pilot symbols. In order to quantify the loss in error performance due to channel estimation errors in the proposed strategy, the performance of the corresponding coherent STBC is taken as the reference.

Figure 7:
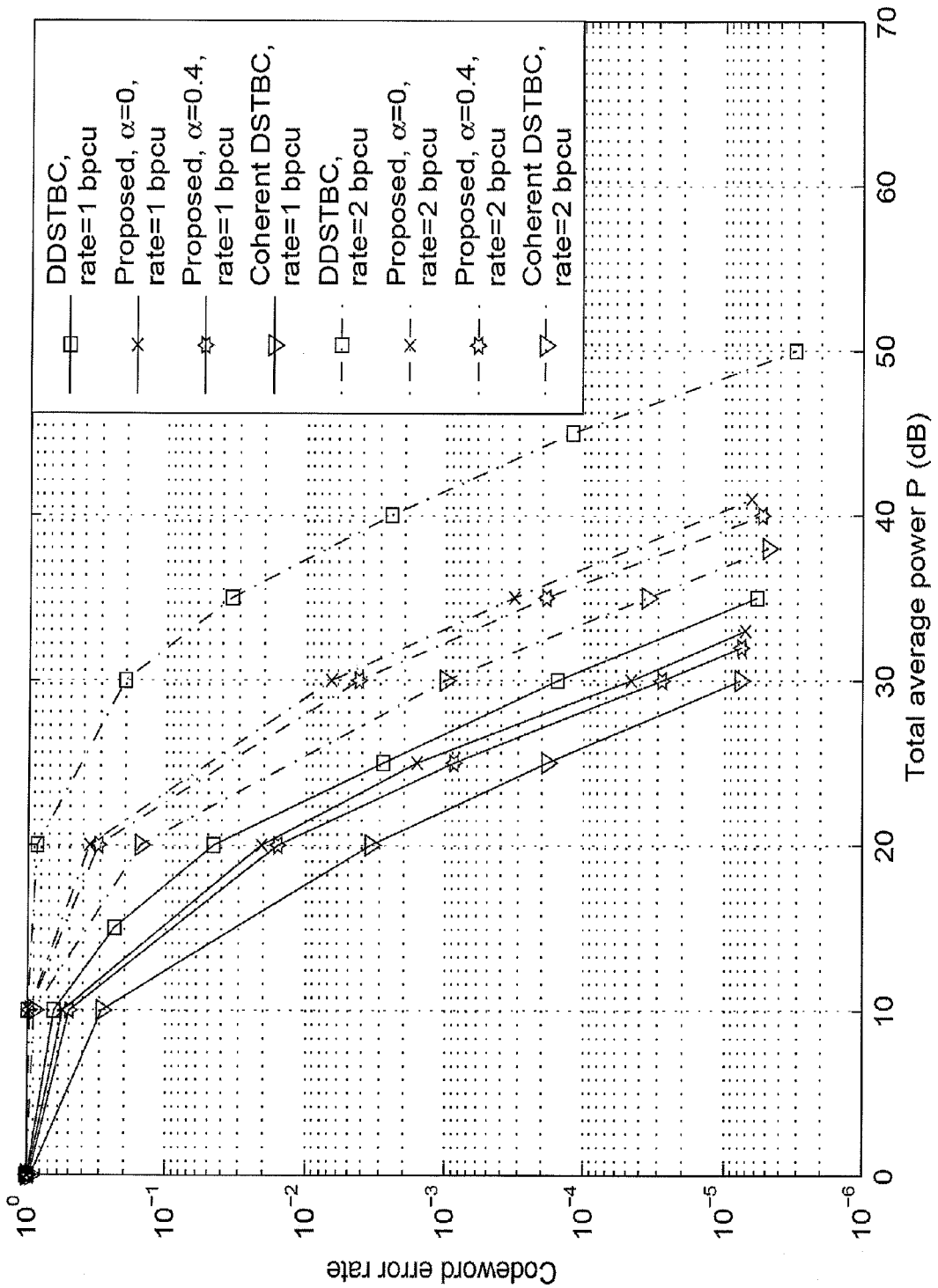
FIG. 7 is table comparing error performance for a 4 relay network using the method of FIG. 2.

FIG. 7 shows the error performance of the proposed strategy for the synchronous case in comparison with the DDSTBC and the corresponding coherent DSTBC for $\alpha=0$, $\alpha=0.4$ and transmission rates of 1 bits per channel use (bpcu) and 2 bpcu respectively. Note that when calculating transmission rate, the rate loss due to initial few channel uses for training is ignored (R+1 for proposed strategy and 2R for DDSTBC).

It can be observed that for a rate of 1 bpcu and codeword error rate (CER) of $10^{-5}$, the proposed strategy outperforms the DDSTBC by approximately 2 dB for $\alpha=0$. For a transmission rate of 2 bpcu, the performance gap between the proposed strategy and the DDSTBC increases to 8 dB. Thus the performance advantage of the proposed strategy over DDSTBCs appears to increase as the transmission rate increases. Also note that the proposed strategy is better than the DDSTBC at all signal to noise ratio (SNR). Three reasons for the proposed strategy to outperform DDSTBCs are as follows: (1) lesser equivalent noise power seen by the destination node during data transmission cycle as compared to the currently reported DDSTBCs, (2) no restriction of coherent DSTBC codewords to unitary/scaled unitary matrices as is the case with the currently reported DDSTBCs, and (3) the relay matrices $B_i$, i=1, 2, . . . , R need not satisfy certain algebraic relations involving the currently reported codewords, thus giving more room to optimize the minimum determinant of difference matrices (coding gain).

In spite of the simple channel estimation method employed (Eq. 5), the performance loss due to channel estimation errors is only about 3 dB for transmission rates of 1 and 2 bpcu, respectively. Finally observe that a 40% power boost to the pilot symbols gives marginally better performance (gain of 0.7 dB). From the simulations, it has been observed that the performance begins to degrade for $\alpha>0.4$. Simulation results are not reported for the asynchronous case because the use of OFDM essentially makes the signal model in every subcarrier similar to the synchronous case and hence the performance will be same but for a rate loss due to CP.

Thus, a training and channel estimation scheme combined with distributed space-time block coding outperforms distributed differential space-time coding at all SNR. The proposed strategy leverages existing coherent DSTBCs for non-coherent communication in AF relay networks. It is emphasized that designing coherent DSTBCs with low ML decoding complexity and/or good coding gain is much simpler compared to designing DDSTBCs wherein there are several stringent constraints. In the foregoing embodiments of the proposed strategy, the relay nodes do not perform any channel estimation. Instead, the relay nodes only amplify and forward the received pilot/data symbols as required. The extra processing required for channel estimation is done only at the destination node. Thus, the proposed strategy based on training and existing coherent DSTBCs is a good alternative to DDSTBCs for practical AF relay networks in terms of performance as well as complexity.

Finally the proposed strategy is extended for application in asynchronous relay networks with no knowledge of the timing errors using OFDM. A drawback of this strategy is that it requires a large channel quasi-static duration spanning over multiple OFDM symbols.

Figure 8:
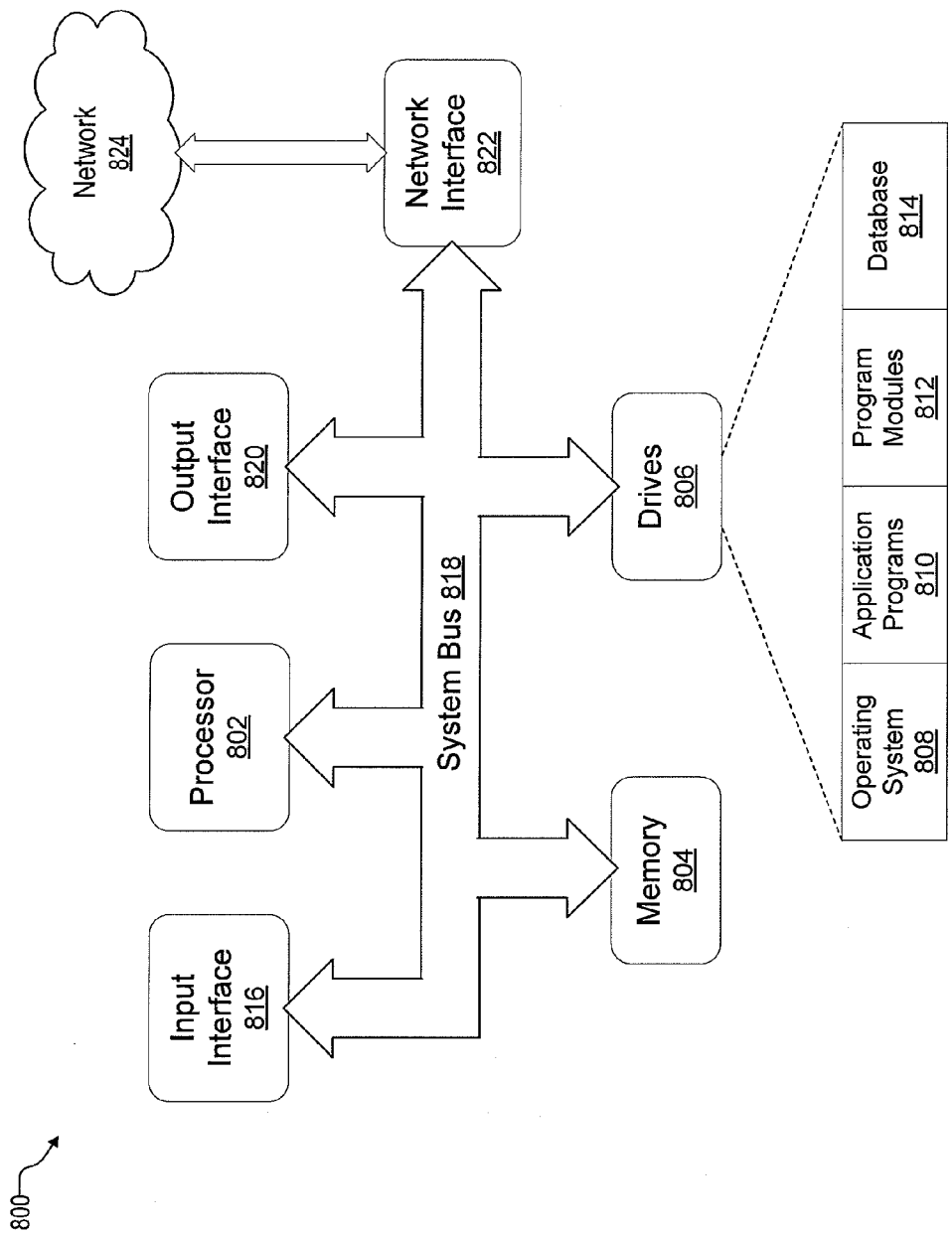
FIG. 8 illustrates an exemplary wireless device 800 for implementing embodiments of the wireless training-based relay network.

FIG. 8 illustrates an exemplary wireless device 800 for implementing embodiments of the nodes in networks 100 and 500. Wireless device 800 includes a processor 802, memory 804, and one or more drives 806. Drives 806 provide storage of computer readable instructions, data structures, program modules, content, and other data for wireless device 800. Drives 806 can include an operating system 808, application programs 810, program modules 812, and database 814. Wireless device 800 further includes an input interface 816 through which commands and data may be entered. Input devices connected to the input interface 816 can include an electronic digitizer, a microphone, a keyboard and a pointing device, commonly referred to as a mouse, trackball or touch pad. Other input devices may include a joystick, game pad, satellite dish, scanner, or the like.

These and other input devices can be connected to processor 802 through the input interface 816 that is coupled to a system bus 818, but may be connected by other interface and bus structures, such as a parallel port, game port or a universal serial bus (USB). Wireless device 800 may also include other peripheral output devices such as speakers and video displays which may be connected through an output interface 820 or the like.

Wireless device 800 may operate in a networked environment using logical connections to one or more remote devices through a network interface 822. The remote computer may be another wireless device, a personal computer, a server, a router, a network PC, a mobile phone, a peer device, or other common network node, and can include many or all of the elements described above relative to wireless device 800. Networking environments are commonplace in offices, enterprise-wide area networks (WAN), local area networks (LAN), intranets and the Internet. For example, in the subject matter of the present application, wireless device 800 may comprise the source machine from which data is being migrated, and the remote computer may comprise the destination machine or vice versa. Note however, that source and destination machines need not be connected by a network 824 or any other means, but instead, data may be migrated via any media capable of being written by the source platform and read by the destination platform or platforms. When used in a LAN or Wireless LAN (WLAN) networking environment, wireless device 800 is connected to the LAN through network interface 822 or an adapter. When used in a WAN networking environment, wireless device 800 typically includes a modem or other means for establishing communications over the WAN, such as the Internet or network 824. It will be appreciated that other means of establishing a communications link between the computers may be used.

According to one embodiment, wireless device 800 is connected in a wireless networking environment such that the processor 802 and/or program modules 812 can perform the wireless training-based relay network with embodiments herein.

Figure 9:
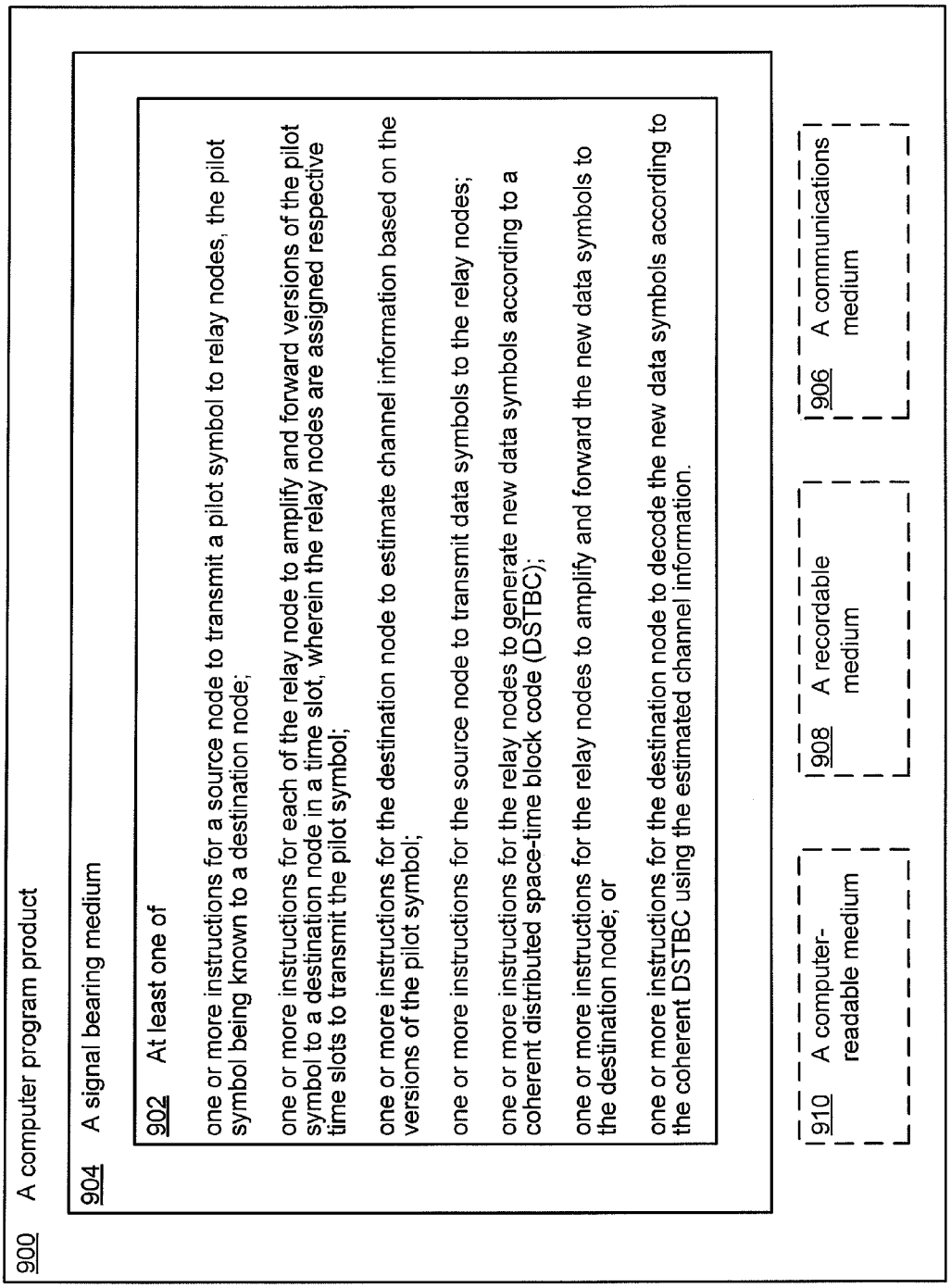
FIG. 9 is a block diagram illustrating a computer program product 900 for a wireless device, all arranged in accordance with embodiments of the present disclosure.

FIG. 9 is a block diagram illustrating a computer program product 900 for a wireless device in one embodiment of the disclosure. Computer program product 900 includes one or more sets of instructions 902 for executing the methods of the multi-copy transmission scheme. Computer program product 900 may be transmitted in a signal bearing medium 904 or another similar communication medium 906. Computer program product 900 may be recorded in a computer readable medium 908 or another similar recordable medium 910.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for one of a plurality of relay nodes in a relay network to amplify and forward data from a source node to a destination node, the method comprising:
    receiving a version of at least one pilot symbol from the source node, the at least one pilot symbol being known to the destination node in a training cycle;
    amplifying and forwarding the version of the at least one pilot symbol to the destination node in a time slot in the training cycle, wherein the relay nodes have respective time slots to transmit their versions of the at least one pilot symbol;
    receiving a version of data symbols from the source node in a data transmission cycle that follows the training cycle;
    generating a new version of the data symbols according to a coherent distributed space-time block code (DSTBC) in the data transmission cycle; and
    amplifying and forwarding the new version of the data symbols to the destination node in the data transmission cycle.

2. The method of claim 1, wherein the at least one pilot symbol consists of a complex number 1.

3. The method of claim 1, wherein the at least one pilot symbol comprises multiple complex number 1s.

4. The method of claim 1, further comprising determining an allocation of a first power for training and a second power for data transmission that improves error performance.

5. The method of claim 4, wherein the first power is greater than the second power by a percentage that ranges up to and including 40%.

6. A method for a destination node in a relay network to communicate with a source node through relay nodes, the method comprising:
    sequentially receiving multiple versions of at least one pilot symbol from the relay nodes, the at least one pilot symbol being transmitted from the source node to the relay nodes, the at least one pilot symbol being known to the destination node;
    estimating channel information based on the multiple versions of the at least one pilot symbol;
    receiving multiple versions of data symbols from the relay nodes at substantially the same time, the data symbols being transmitted from the source node to the relay nodes, the multiple versions of the data symbols being generated by the relay nodes according to a coherent distributed space-time block code (DSTBC); and
    decoding the multiple versions of the data symbols to determine data from the source node according to the coherent DSTBC using estimated channel information.

7. The method of claim 6, wherein the at least one pilot symbol consists of a complex number of 1.

8. The method of claim 7, wherein said estimating channel information comprises determining an estimated equivalent channel matrix as follows:

$$\hat{h} = \sqrt{\frac{\pi_1 \pi_2 P_t^2 R}{\pi_1 P_t + 1}} \left( \frac{\pi_2 P_t R + \pi_1 \pi_2 P_t^2 R}{\pi_1 P_t + 1} + 1 \right)^{-1} \hat{y},$$

where $P_t$ is the total power dedicated to training, $\pi_1$ is a fraction of the total power $P_t$ for the source node to transmit to the relay nodes, $\pi_2$ is a fraction of the total power $P_t$ for the relay nodes to transmit to the source node, R is the number of relay nodes, and $\hat{y}$ is the multiple versions of the at least one pilot symbol received at the destination node.

9. The method of claim 8, wherein said decoding the multiple versions of the data symbols comprises:

$$\hat{X} = \mathrm{argmin}_{X \in \Lambda} \left\| y - \sqrt{\frac{\pi_1 \pi_2 P_d^2}{\pi_1 P_d + 1}} Xh \right\|_F^2.$$

where $\hat{X}$ is the decoded data at the destination node, $P_d$ is the total power dedicated to data transmission, $\Lambda$ denotes the set of all possible codeword matrices X, y is the multiple versions of the data symbols received at the destination node, h is the equivalent channel matrix to be replaced with the estimated equivalent channel matrix, and F is the total number of data transmission cycle that can be accommodated in a channel quasi-static duration.

10. The method of claim 6, wherein:
    the at least one pilot symbol comprises multiple complex number 1s;
    said sequentially receiving multiple version of the at least one pilot symbol comprises applying orthogonal frequency division multiplexing (OFDM) decoding to the multiple complex number 1s;
    said estimating channel information comprises estimating the channel information for OFDM subcarriers; and
    said decoding the multiple versions of the data symbols comprises applying OFDM based coherent DSTBC using the estimated channel information for the OFDM subcarriers.

11. A non-transitory computer-readable storage medium encoded with computer-executable instructions for execution by one of a plurality of relay nodes in a relay network to amplify and forward data from a source node to a destination node, the instructions comprising:
    receiving a version of at least one pilot symbol from the source node, the at least one pilot symbol being known to the destination node;
    amplifying and forwarding the version of the at least one pilot symbol to the destination node in a time slot, wherein the relay nodes are assigned respective time slots to transmit their versions of the at least one pilot symbol;

receiving a version of data symbols from the source node in a data transmission cycle that follows the training cycle;

generating a new version of the data symbols according to a coherent distributed space-time block code (DSTBC); and amplifying and forwarding the new version of the data symbols to the destination node.

12. The non-transitory computer-readable storage medium of claim 11, wherein the at least one pilot symbol consists of a complex number 1.

13. The non-transitory computer-readable storage medium of claim 11, wherein:
the at least one pilot symbol comprises multiple complex number 1s;
said amplifying and forwarding the version of the at least one pilot symbol comprises applying orthogonal frequency division multiplexing (OFDM) encoding to the multiple complex number 1s; and
the coherent DSTBC comprises an OFDM based coherent DSTBC.

14. The non-transitory computer-readable storage medium of claim 11, wherein the instructions further comprise determining an allocation of a first power for training and a second power for data transmission that improves error performance.

15. The non-transitory computer-readable storage medium of claim 14, wherein the first power is greater than the second power by a percentage that ranges up to and including 40%.

16. A non-transitory computer-readable storage medium encoded with computer-executable instructions for execution by a destination node in a relay network to communicate with a source node through relay nodes, the instructions comprising:
sequentially receiving multiple versions of at least one pilot symbol from the relay nodes, the at least one pilot symbol being transmitted from the source node to the relay nodes, the at least one pilot symbol being known to the destination node;
estimating channel information based on the multiple versions of the at least one pilot symbol;
receiving multiple versions of data symbols from the relay nodes at substantially the same time, the data symbols being transmitted from the source node to the relay nodes, the multiple versions of the data symbols being generated by the relay nodes according to a coherent distributed space-time block code (DSTBC); and
decoding the multiple versions of the data symbols to determine data from the source node according to the coherent DSTBC using estimated channel information.

17. The non-transitory computer-readable storage medium of claim 16, wherein the at least one pilot symbol consists of a complex number of 1.

18. The non-transitory computer-readable storage medium of claim 17, wherein said estimating channel information comprises determining an estimated equivalent channel matrix as follows:

$$\hat{h} = \sqrt{\frac{\pi_1 \pi_2 P_t^2 R}{\pi_1 P_t + 1}} \left( \frac{\pi_2 P_t R + \pi_1 \pi_2 P_t^2 R}{\pi_1 P_t + 1} + 1 \right)^{-1} \hat{y},$$

where $P_t$ is the total power dedicated to training, $\pi_1$ is a fraction of the total power $P_t$ for the source node to transmit to the relay nodes, $\pi_2$ is a fraction of the total power $P_t$ for the relay nodes to transmit to the source node, R is the number of relay nodes, and $\hat{y}$ is the multiple versions of the at least one pilot symbol received at the destination node.

19. The non-transitory computer-readable storage medium of claim 18, wherein said decoding the multiple versions of the data symbols comprises:

$$\hat{X} = \mathrm{argmin}_{X \in \Lambda} \left\| y - \sqrt{\frac{\pi_1 \pi_2 P_d^2}{\pi_1 P_d + 1}} \, Xh \right\|_F^2.$$

where $\hat{X}$ is the decoded data at the destination node, $P_d$ is the total power dedicated to data transmission, $\Lambda$ otes the set of all possible codeword matrices X, y is the multiple versions of the at least one pilot symbol received at the destination node, h is the equivalent channel matrix to be replaced with the estimated equivalent channel matrix, and F is the total number of data transmission cycle that can be accommodated in a channel quasi-static duration.

20. The non-transitory computer-readable storage medium of claim 16, wherein:
the at least one pilot symbol comprises multiple complex number 1s;
said sequentially receiving multiple version of the at least one pilot symbol comprises applying orthogonal frequency division multiplexing (OFDM) decoding to the multiple complex number 1s;
said estimating channel information comprises estimating the channel information for OFDM subcarriers; and
said decoding the multiple versions of the data symbols comprises applying OFDM based coherent DSTBC using the estimated channel information for the OFDM subcarriers.

21. A relay network, comprising
a source node for:
transmitting at least one pilot symbol to relay nodes in a training cycle; and
transmitting data symbols to the relay nodes in a data transmission cycle, wherein the data symbols represent data;
the relay nodes each for:
receiving a version of the at least one pilot symbol from the source node in the training cycle;
amplifying and forwarding the version of the at least one pilot symbol to a destination node in a time slot in the training cycle, wherein the relay nodes are assigned respective time slots to transmit the at least one pilot symbol;
receiving a version of the data symbol from the source node in the data transmission cycle that follows the training cycle;
generating a new version of the data symbols according to a coherent distributed space-time block code (DSTBC) in the data transmission cycle;
amplifying and forwarding the new version of the data symbols to the destination node in the data transmission cycle; and
the destination node for:
sequentially receiving multiple versions of the at least one pilot symbol from the relay nodes in the training cycle, wherein the at least one pilot symbol is known to the destination node;

estimating channel information based on the multiple versions of the at least one pilot symbol in the training cycle;

receiving multiple versions of the data symbols from the relay nodes at substantially the same time in the data transmission cycle; and decoding the multiple versions of the data symbols to determine the data from the source node according to the coherent DSTBC using the estimated channel information in the data transmission cycle.

\* \* \* \* \*

UNITED STATES PATENT AND TRADEMARK OFFICE
CERTIFICATE OF CORRECTION

PATENT NO. : 8,089,916 B2
APPLICATION NO. : 12/419430
DATED : January 3, 2012
INVENTOR(S) : Gulasekaran et al.

It is certified that error appears in the above-identified patent and that said Letters Patent is hereby corrected as shown below:

In the Drawings:

In Fig. 6, Sheet 6 of 9, for Tag "602", in Line 2, delete "ODFM" and insert -- OFDM --, therefor.

In Fig. 6, Sheet 6 of 9, for Tag "604", in Line 3, delete "ODFM" and insert -- OFDM --, therefor.

In Fig. 6, Sheet 6 of 9, for Tag "608", in Line 2, delete "ODFM" and insert -- OFDM --, therefor.

In Fig. 6, Sheet 6 of 9, for Tag "610", in Line 3, delete "ODFM" and insert -- OFDM --, therefor.

In the Specifications:

In Column 2, Line 7, delete "is table" and insert -- is a table --, therefor.

In Column 4, Lines 21-23, in Equation (1), delete " $\sqrt{\frac{\pi_1 \pi_2 P_d^2}{\pi_i P_d + 1}}$ " and insert -- $\sqrt{\frac{\pi_1 \pi_2 P_d^2}{\pi_1 P_d + 1}}$ --, therefor.

In Column 5, Line 60, delete " transmits $\hat{r}_i$ " and insert -- $\hat{r}_i$ --, therefor.

In Column 8, Line 9, delete "ODFM" and insert -- OFDM --, therefor.

In Column 8, Line 39, delete "where is the" and insert -- is the --, therefor.

In Column 9, Line 13, delete " $e^{i2\pi k\tau/N}$ " and insert -- $e^{\frac{i2\pi k\tau}{N}}$ --, therefor.

In Column 12, Line 32, delete "(WAN)," and insert -- (WANs), --, therefor.

Signed and Sealed this
Eleventh Day of June, 2013

Teresa Stanek Rea
*Acting Director of the United States Patent and Trademark Office*

CERTIFICATE OF CORRECTION (continued)
U.S. Pat. No. 8,089,916 B2

In Column 12, Line 33, delete "(LAN)," and insert -- (LANs), --, therefor.

In the Claims:

In Column 18, Line 16, in Claim 19, delete "otes" and insert -- denotes --, therefor.